(12) United States Patent
Egashira et al.

(10) Patent No.: US 8,071,684 B2
(45) Date of Patent: Dec. 6, 2011

(54) GOLF BALL MATERIAL, GOLF BALL AND METHOD FOR PREPARING GOLF BALL MATERIAL

(75) Inventors: Yoshinori Egashira, Chichibu (JP); Jun Shindo, Chichibu (JP); Eiji Takehana, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 391 days.

(21) Appl. No.: 12/273,042

(22) Filed: Nov. 18, 2008

(65) Prior Publication Data

US 2010/0125001 A1    May 20, 2010

(51) Int. Cl.
*A63B 37/00* (2006.01)
*A63B 37/12* (2006.01)
*C08L 33/02* (2006.01)
*C08L 61/10* (2006.01)

(52) U.S. Cl. ........ 525/143; 525/138; 473/372; 473/373; 473/378; 473/385

(58) Field of Classification Search .................. None
See application file for complete search history.

(56) References Cited

U.S. PATENT DOCUMENTS

| | | | |
|---|---|---|---|
| 3,843,576 A * | 10/1974 | Parkinson | 524/510 |
| 4,476,277 A * | 10/1984 | Koyama et al. | 524/509 |
| 4,703,086 A * | 10/1987 | Yamamoto et al. | 525/133 |
| 4,984,804 A | 1/1991 | Yamada et al. | |
| 5,197,740 A | 3/1993 | Pocklington et al. | |
| 5,492,972 A | 2/1996 | Stefani | |
| 5,625,003 A | 4/1997 | Kato et al. | |
| 5,631,324 A | 5/1997 | Rajagopalan et al. | |
| 5,688,869 A * | 11/1997 | Sullivan | 525/196 |
| 5,824,746 A | 10/1998 | Harris et al. | |
| 5,833,552 A * | 11/1998 | Hamada et al. | 473/359 |
| 5,837,775 A | 11/1998 | Snell et al. | |
| 6,100,321 A | 8/2000 | Chen | |
| 6,100,340 A | 8/2000 | Rajagopalan et al. | |
| 6,117,026 A | 9/2000 | Hayashi et al. | |
| 6,329,458 B1 | 12/2001 | Takesue et al. | |
| 6,359,065 B1 | 3/2002 | Yabuki | |
| 6,359,066 B1 * | 3/2002 | Yabuki | 525/71 |
| 6,494,792 B2 | 12/2002 | Sullivan | |
| 6,608,127 B1 * | 8/2003 | Kato et al. | 524/272 |
| 6,653,382 B1 | 11/2003 | Statz et al. | |
| 6,852,043 B2 | 2/2005 | Sullivan et al. | |
| 6,905,425 B2 | 6/2005 | Sasaki et al. | |
| 6,962,951 B1 | 11/2005 | Takesue et al. | |
| 7,402,114 B2 | 7/2008 | Binette et al. | |
| 2004/0162219 A1 * | 8/2004 | Hiroishi | 503/201 |

FOREIGN PATENT DOCUMENTS

JP          08027356    *  1/1996

* cited by examiner

*Primary Examiner* — David Buttner
(74) *Attorney, Agent, or Firm* — Sughrue Mion, PLLC

(57) ABSTRACT

The present invention provides a golf ball material which is made of an ionomer composition that includes a phenolic resin component. The invention provides also a golf ball composed of a core and a cover layer, or a core, a cover layer and at least one intermediate layer therebetween, wherein the golf ball material is used in at least one layer of the core or cover. The invention additionally provides a method for preparing the golf ball material by using (i) or (ii) below:

(i) melt blending an ionomer and a phenolic resin;
(ii) melt blending an ionomer base resin, a metal cation source and a phenolic resin.

The golf ball material of the invention has improved properties, including rebound resilience, durability, and a higher hardness. By using this golf ball material as the material for an essential part of a golf ball, the golf ball properties can be improved.

16 Claims, No Drawings

GOLF BALL MATERIAL, GOLF BALL AND METHOD FOR PREPARING GOLF BALL MATERIAL

BACKGROUND OF THE INVENTION

The present invention relates to a golf ball material for use in at least one of the layers making up a golf ball, such as the core or cover. More specifically, the invention relates to a golf ball material composed of an ionomer composition, the hardness of which has been increased with a phenolic resin component. The present invention relates further to a golf ball having, as an essential part thereof, a molding made of such a golf ball material, and relates still further to a method for preparing such a golf ball material.

Various ionomers (typical products include those commercially sold under the trade names "Surlyn," produced by E.I. DuPont de Nemours & Company; "Iotek," produced by Exxon Chemical; and "Primacor," produced by Dow Chemical) are used as constituents in many golf balls. Tradition balata rubber is flexible and has an excellent resilience, but lacks durability. Compared with balata rubber, ionomers have a poor resilience but an excellent durability, which is why they are still in use today.

Approaches commonly taken to increase the resilience of ionomers employed in golf balls include using an ionomer base polymer having a high acid content and subjecting it to a high degree of neutralization with metal cations, including a higher fatty acid in the ionomer base polymer and subjecting the base polymer to a high degree of neutralization, combining different metal cationic species within the ionomer, and blending into the ionomer a thermoplastic material having a high resilience. Numerous patent applications have been filed relating to each of these approaches.

Examples include Patent Document 1: U.S. Pat. No. 6,100,340, Patent Document 2: U.S. Pat. No. 6,117,026, Patent Document 3: U.S. Pat. No. 6,277,921, Patent Document 4: U.S. Pat. No. 6,433,094, Patent Document 5: U.S. Pat. No. 6,494,792 and Patent Document 6: U.S. Pat. No. 6,852,043, all of which describe golf balls that use ionomers having a high acid content and a high degree of neutralization; Patent Document 7: U.S. Pat. No. 6,100,321, Patent Document 8: U.S. Pat. No. 6,653,382, Patent Document 9: U.S. Pat. No. 6,329,458, Patent Document 10: U.S. Pat. No. 6,962,951 and Patent Document 11: U.S. Pat. No. 7,402,114, all of which describe golf balls that use ionomer compositions obtained by including a higher fatty acid in an ionomer base polymer and subjecting the base polymer to a high degree of neutralization; Patent Document 12: U.S. Pat. No. 4,984,804, Patent Document 13: U.S. Pat. No. 5,197,740, Patent Document 14: U.S. Pat. No. 5,492,972, Patent Document 15: U.S. Pat. No. 5,837,775 and Patent Document 16: U.S. Pat. No. 6,494,792, all of which describe golf balls that use ionomer compositions obtained by combining different metal cationic species within the ionomer; and Patent Document 17: U.S. Pat. No. 5,625,003, Patent Document 18: U.S. Pat. No. 5,631,324, Patent Document 19: U.S. Pat. No. 5,824,746, Patent Document 20: U.S. Pat. No. 6,359,065 and Patent Document 21: U.S. Pat. No. 6,905,425, all of which describe golf balls that use an ionomer composition in which has been blended a thermoplastic material having a high resilience.

Of the above, golf balls which use an ionomer having a high degree of neutralization generally are endowed with a high resilience and a high hardness, but have a poor durability. Moreover, ionomer compositions which use a base polymer having a high acid content are expensive. Golf balls made using ionomers which contain a higher fatty acid and have a high degree of neutralization also tend to exhibit a poor durability.

Lately, there continues to exist a desire, with regard to golf balls made using ionomer components, to reduce the spin of the ball at high swing velocities (head speeds) and thus increase by a corresponding amount the distance traveled by the ball. There is also a desire, concerning golf balls made using relatively inexpensive, moderate acid-content ionomers instead of the above costly, high acid-content ionomer components, to increase the hardness of the ball and reduce the spin, thereby extending the distance traveled by the ball.

Patent Document 1: U.S. Pat. No. 6,100,340
Patent Document 2: U.S. Pat. No. 6,117,026
Patent Document 3: U.S. Pat. No. 6,494,792
Patent Document 4: U.S. Pat. No. 6,852,043
Patent Document 5: U.S. Pat. No. 6,494,792
Patent Document 6: U.S. Pat. No. 6,852,043
Patent Document 7: U.S. Pat. No. 6,100,321
Patent Document 8: U.S. Pat. No. 6,653,382
Patent Document 9: U.S. Pat. No. 6,329,458
Patent Document 10: U.S. Pat. No. 6,962,951
Patent Document 11: U.S. Pat. No. 7,402,114
Patent Document 12: U.S. Pat. No. 4,984,804
Patent Document 13: U.S. Pat. No. 5,197,740
Patent Document 14: U.S. Pat. No. 5,492,972
Patent Document 15: U.S. Pat. No. 5,837,775
Patent Document 16: U.S. Pat. No. 6,494,792
Patent Document 17: U.S. Pat. No. 5,625,003
Patent Document 18: U.S. Pat. No. 5,631,324
Patent Document 19: U.S. Pat. No. 5,824,746
Patent Document 20: U.S. Pat. No. 6,359,065
Patent Document 21: U.S. Pat. No. 6,905,425

SUMMARY OF THE INVENTION

It is therefore an object of the present invention to provide a golf ball material which, in an ionomer composition based on an ionomer, has an increased material hardness, thus lowering the spin rate on the golf ball and enabling the ball to travel an increased distance, and which also has an excellent durability. Further objects of the invention are to provide a golf ball composed of such a material and a method for preparing such a golf ball material.

The inventors have studied the blending of phenolic resins in ionomer compositions which contain an ionomer component as the primary resin component. Specifically, with respect to the mixing of thermoset resins and thermoplastic resins, which is an area that remains substantially unexplored in golf ball applications, the inventors, by employing phenolic resins as the "decision branch" for thermoset resins and ionomers as the "decision branch" for thermoplastic resins, have discovered that materials basically constituted in this way are ideal materials for achieving the present objects. In such a case, using an ionomer other than a modified ionomer as the foregoing ionomer is desirable because properties such as resilience, durability and manufacturing efficiency can often be maintained.

Moreover, the inventors have learned from further investigations that golf balls which include as a component thereof (referring, here and below, to the cover material or intermediate layer material in a two-piece solid golf ball composed of a core and a cover encasing the core or in a multi-piece solid golf ball composed of a core of one or more layer, one or more intermediate layer encasing the core, and a cover of one or more layer encasing the intermediate layer) an ionomer composition made up of the foregoing phenolic resin and ionomer have an improved performance, including resilience and durability, and thus have excellent properties.

Accordingly, the present invention provides the following golf ball material, golf ball, and method for preparing a golf ball material.

[1] A golf ball material comprising an ionomer composition, wherein the ionomer composition includes a phenolic resin component.

[2] The golf ball material of [1], wherein the phenolic resin component in the ionomer composition is included, in a proportion based on total weight of the ionomer, composition of from about 0.01 to about 10.0 wt %.

[3] The golf ball material of [1], wherein the phenolic resin component is a resol-type phenolic resin component.

[4] The golf ball material of [3], wherein the resol-type phenolic resin has a chemical structure of the following formula

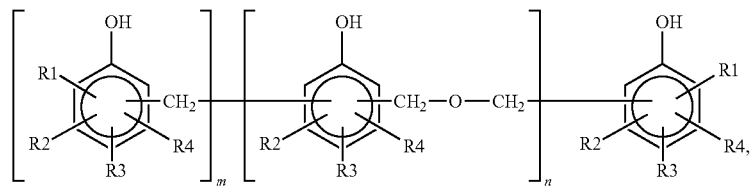

wherein $R_1$ is hydrogen or methylol; $R_2$, $R_3$ and $R_4$ are each independently hydrogen group, an alkyl group, cyclic alkyl group, aralkyl group, alkoxy group, aryl or alkenyl group of from 1 to 20 carbons, hydroxyl or a halogen atom; and the letters m and n are each a number from 1 to about 50.

[5] The golf ball material of [4], wherein the resol-type phenolic resin has a softening point (ring and ball method) in a range of from about 30° C. to about 200° C.

[6] The golf ball material of [3], wherein adding the resol-type phenolic resin component increases the Shore D hardness of the ionomer composition by from about 0.1 point to about 10 points.

[7] The golf ball material of [1], wherein the ionomer composition includes an ionomer component which is at least one type of copolymer of the formula E/X and/or terpolymer of the formula E/X/Y, E being an α-olefin, X being a $C_3$ to $C_8$ unsaturated carboxylic acid or unsaturated dicarboxylic acid (including acid anhydrides thereof) and Y being an unsaturated carboxylic acid or unsaturated dicarboxylic acid alkyl ester in which the alkyl has from 1 to 8 carbons, where X is present in an amount of from about 1 to about 30 wt based on total weight of the E/X copolymer or E/X/Y terpolymer and Y is present in an amount of from about 2 to about 30 wt % based on total weight of the E/X/Y terpolymer, and which is neutralized by metal cations.

[8] The golf ball material of [7], wherein the metal cations in the ionomer component include lithium, sodium, potassium, zinc, calcium, magnesium, nickel, manganese, copper, titanium, aluminum, or a combination thereof.

[9] The golf ball material of [8], wherein the metal cations originate from a metal cation source which is an oxygen-containing inorganic compound.

[10] A golf ball comprising a core and a cover layer, or a core, a cover layer and at least one intermediate layer therebetween, wherein the above golf ball material is used in at least one layer of the core or cover.

[11] A method for preparing the above golf ball material, which method obtains the ionomer composition by using method (i) or (ii) below:

(i) melt blending an ionomer and a phenolic resin;

(ii) melt blending an ionomer base resin, a metal cation source and a phenolic resin.

[12] The golf ball material preparing method of [11] wherein, in method (ii), the ionomer composition is prepared by first uniformly mixing the ionomer base resin and the phenolic resin, then adding the metal cation source and melt blending while carrying out a neutralization reaction.

DETAILED DESCRIPTION OF THE INVENTION

The invention is described more fully below.

In arriving at the present invention, first an investigation was conducted as to whether the hardness of an ionomer can be increased by including small amounts of certain resin components. In this investigation, materials which interact with the ionomer, i.e., materials having interactions mediated by metal cations in the ionomer, were examined.

It was learned that, of the materials investigated, phenolic resins having many hydroxyl groups with protonicity (acidity) exhibit considerable interactions with ionomer materials.

An investigation was also conducted to determine whether the performance of the golf ball ultimately obtained can be improved by including a small amount of phenolic resin in the ionomer.

As a result, it was found that, when included in a small amount, phenolic resins are suitable as materials for increasing the hardness of an ionomer.

The golf ball material of the invention is composed primarily of an ionomer composition. Specifically, the ionomer composition accounts for more than 50 wt %, preferably at least 70 wt %, and more preferably at least 80 wt %, of the overall weight of the golf ball material. In the present invention, the above ionomer composition in which a phenolic resin component has been included is referred to as "a phenolic resin-containing ionomer composition." This composition is described in detail below.

Phenolic resins have substantially no interactions with the ethylene-α,β-unsaturated carboxylic acid copolymer or ethylene-α,β-unsaturated carboxylic acid-acrylate terpolymer serving as the ionomer base polymer. That is, phenolic resins do not exhibit interactions with acid copolymers that include no metal cationic species on the molecule. However, phenolic resins do exhibit interactions with ionomers. In other words, they have interactions with ionomers that are mediated by metal cationic species. In experiments conducted by the inventors, blending and mixing were carried out in a Labo Plastomill, and the interactions were evaluated by the change in torque. A larger change in torque signifies greater interactions. Concerning this point, reference can be made to the subsequently described experiments.

With regard to the ionomers on which experiments were carried out, an increase in torque—indicating a trend toward greater interaction—in the following order was observed: sodium (Na)-neutralized ionomer<magnesium (Mg)-neutralized ionomer<zinc (Zn)-neutralized ionomer. The metal cationic species in the ionomer may be lithium, sodium, lithium, potassium, zinc, calcium, magnesium, nickel, manganese, copper, titanium, aluminum, or a combination thereof.

The phenolic resin used in the present invention is preferably a resol-type phenol because the advantageous effects of the invention are larger with the use of a resol-type phenol (referred to below as simply "resol") having a linear structure than with the use of a novolak-type phenol having a three-dimensional structure. The use of a novolak-type phenol (referred to below as simply "novolak") in the invention is undesirable because there is a tendency for a gel-like material to form and for the system to be non-uniform.

Phenolic resins exist in a number of forms, including as liquids, in bulk, as powders and as flakes, any of which may be employed as appropriate. In terms of ease of handling, phenolic resins other than in liquid form are especially preferred for use in the present invention.

The phenolic resin component accounts for a proportion of the ionomer composition which, while not subject to any particular limitation, is preferably at least about 0.01 wt %, more preferably at least about 0.05 wt %, and even more preferably at least about 0.10 wt %. The upper limit is preferably not more than about 10.0 wt %, more preferably not more than about 8.00 wt %, and even more preferably not more than about 5.00 wt %. If the amount of the phenolic resin ingredient is lower than the above range, the desired increase in ionomer hardness may not be achieved. On the other hand, if the amount of the phenolic resin ingredient is higher than the above range, an increase in hardness will be achieved, but the flow properties of the ionomer resin may dramatically decline, leading to problems with the manufacturability.

The ionomer component of the ionomer composition used in the present invention is not subject to any particular limitation. However, it is preferable to use a material which is at least one type of copolymer of the formula E/X and/or terpolymer of the formula E/X/Y, where E is an α-olefin, X is a $C_3$ to $C_8$ unsaturated carboxylic acid or unsaturated dicarboxylic acid (including acid anhydrides thereof) and Y is an unsaturated carboxylic acid alkyl ester or unsaturated dicarboxylic acid alkyl ester in which the alkyl has from 1 to 8 carbons, and where X is present in an amount of from about 1 to about 30 wt % based on total weight of the E/X copolymer or E/X/Y terpolymer and Y is present in an amount of from about 2 to about 30 wt % based on total weight of the E/X/Y terpolymer, and which is partially or fully neutralized by metal cations.

In the above copolymer E/X or terpolymer E/X/Y, examples of olefins that may be used as E include ethylene, propylene, butene, heptene, hexene, heptene and octene. The use of ethylene is especially preferred.

Examples of unsaturated carboxylic acids that may be used as X include acrylic acid, methacrylic acid, (anhydrous) maleic acid and fumaric acid. The use of acrylic acid or methacrylic acid is especially preferred. Examples of unsaturated dicarboxylic acid that may be used as X include maleic acid, fumaric acid and itaconic acid. Examples of unsaturated carboxylic anhydrides that may be used as X include maleic anhydride and itaconic anhydride. The use of maleic acid or maleic anhydride is especially preferred.

Examples of unsaturated carboxylic acid esters that may be suitably used as Y include lower alkyl esters of the foregoing unsaturated carboxylic acids. Illustrative examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. Examples of the half-esters of unsaturated dicarboxylic acids that may be used as Y include monoesters of the above dicarboxylic acids, such as the monoethyl ester of maleic acid, the monomethyl ester of fumaric acid and the monoethyl ester of itaconic acid. The use of the monoethyl ester of maleic acid is especially preferred.

One or a combination of two or more selected from the group consisting of lithium, sodium, potassium, zinc, calcium, magnesium, nickel, manganese, copper, titanium and aluminum may be used as the metal cations in the above-mentioned ionomer component. The above metal cations may originate from a metal cation source which is an oxygen-containing inorganic compound.

Here, the copolymer of the formula E/X and/or the terpolymer of the formula E/X/Y may serve as the base resin of the ionomer. Illustrative examples of this base resin include commercially available thermoplastic resins, such as the product "Nucrel 960" (available from DuPont) and the product "ESCOR5100" (available from Exxon-Mobil Chemical).

Alternatively an ionomer resin obtained by the partial or full neutralization of the above copolymer or terpolymer with metal cations may be directly used. In such a case, a commercially available product, such as a resin of the product series "Surlyn" (available from DuPont), "Himilan" (available from DuPont-Mitsui Polychemicals), or "Iotek" (available from Exxon-Mobile Chemical) may be used as the ionomer resin.

As noted above, it is preferable to employ a resol as the above-mentioned phenolic resin component. The use of a resol of the following structural formula is especially preferred.

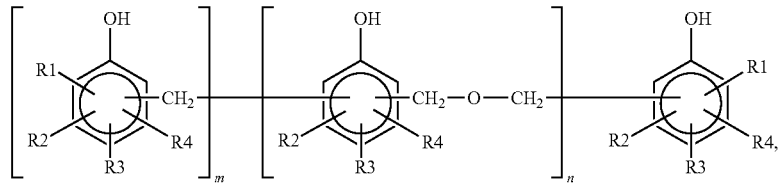

In the formula, $R_1$ is hydrogen or methylol; $R_2$, $R_3$ and $R_4$ are each independently hydrogen group, an alkyl group, cyclic alkyl group, aralkyl group, alkoxy group, aryl or alkenyl group of from 1 to 20 carbons, hydroxyl or a halogen atom; and the letters m and n are each a number from 1 to about 50.

The above resol has a softening point (ring and ball method) which, although not subject to any particular limitation, is preferably in a range of from about 30 to about 200° C., more preferably from about 40 to about 180° C., and even more preferably from about 50 to about 150° C. A phenolic resin with a higher softening point is desirable because the hardness of the resulting ionomer composition tends to become higher as the softening point increases. The softening point (ring and ball method) is the value defined in JIS K7234.

The resol included in the ionomer composition of the present invention is exemplified by, but not limited to, the following: TAMANOL 1010R (softening point (Sp), approx. 98° C.), TAMANOL 521 (Sp, approx. 108° C.), TAMANOL 526 (Sp, about 123° C.) and TAMANOL 572S (Sp, approx. 125° C.), all produced by Arakawa Chemical Industries, Ltd.; SP-1045 (Sp, approx. 88° C.), SP-1055 (Sp, approx. 90° C.) and HRJ-10518 (Sp, approx. 88° C.), all produced by Shenectady International; RESITOP PL-2407 (approx. 200 mPa·sec/25° C.), RESITOP PL-4329 (approx. 650 mPa/25° C.), RESITOP PS-4609 (Sp, approx. 62° C.), RESITOP PS-2601 (Sp, approx. 90° C.) and RESITOP PS-2768 (Sp, approx. 105° C.), all produced by Gun Ei Chemical Industry Co., Ltd.; PHENOLITE DG-630 (approx. 250 mPa·sec/25° C.), PHENOLITE PZ-9000 (Sp, approx. 65° C.) and PHENOLITE P-5510 (Sp, approx. 95° C.), all produced by DIC Corporation; and AVLITE HP3000A (approx. 120 mPa·sec/25° C.) and AVLITE SP456A (Sp, approx. 65° C.), both produced by Asahi Organic Chemicals Industry Co., Ltd. Illustrative examples of resol derivatives include PHENOLITE 6000 (approx. 500 mPa·sec/25° C.; a resorcinol resin) and PHENOLITE UG-2302 (approx. 6,000 mPa·sec/25° C.; ethylene glycol-modified), both produced by DIC Corporation; and AVLITE HP1000N (approx. 30 mPa·sec/25° C.; a phenol-furan resin), which is produced by Asahi Organic Chemicals Industry Co., Ltd.

Of the above group of resols, any one or combination of two or more resols may be suitably selected in accordance with the ionomer composition hardness that is desired.

In addition, other thermoplastic resins may be included in the ionomer composition obtained in the present invention. Examples of such thermoplastic resins include, but are not limited to, polyolefin elastomers (including ethylene ionomers, polyolefins and metallocene polyolefins), polystyrene elastomers, diene polymers, polyacrylate polymers, polyamide elastomers, polyurethane elastomers, polyester elastomers and polyacetals. These may be optionally blended and also used as golf ball materials.

In the golf ball material of the invention, including a phenolic resin in an ionomer composition which is based on an ionomer component increases the hardness, thereby improving properties such as the rebound resilience and durability, relative to prior-art ionomer compositions which do not include a phenolic resin.

Specifically, by including a phenolic resin in the ionomer, the hardness of the resulting ionomer composition is increased by from about 0.1 to about 10 Shore D hardness points relative to the original ionomer. Moreover, there is a desirable tendency for the resulting ionomer composition to have a higher hardness as the softening point of the phenolic resin becomes higher.

Also, when a phenolic resin is included in the ionomer, the melt flow rate (MFR) of the ionomer composition tends to decrease relative to the MFR of the original ionomer. Therefore, in cases where the golf ball material is injection-molded to fabricate an essential part of a golf ball such as the cover, it is desirable to set the MFR within an injection-moldable range. Specifically, the melt flow rate (MFR) of the golf ball material is preferably at least 0.3, more preferably at least 0.5, and even more preferably at least 1.0. The upper limit in the melt flow rate of the golf ball material is preferably not more than 20, more preferably not more than 18, and even more preferably not more than 15.

The method for preparing the ionomer composition included in the golf ball material of the invention may employ either of the following techniques: (i) melt blending an ionomer and a phenolic resin, or (ii) melt blending an ionomer base resin (the above-mentioned copolymer or terpolymer, and/or a mixture thereof), a metal cation source and a phenolic resin. With regard to above method (ii), it is preferable to employ a method of preparing the ionomer composition by first uniformly mixing the ionomer base resin and the phenolic resin, then adding the metal cation source and melt blending while carrying out a neutralization reaction.

The temperature at which the phenolic resin used to prepare the ionomer composition and the ionomer material are mixed is typically from about 100 to about 250° C., preferably from about 150 to about 245° C., and more preferably from about 180 to about 240° C. In place of the ionomer material, use may instead be made of the ionomer base resin and the metal cation source. In such a case, the above ionomer composition may be obtained by either blending and melt mixing the ionomer base resin, phenolic resin and metal cation source at the same time or, preferably, by first uniformly mixing the ionomer base resin and the phenolic resin, then adding the metal cation source. The metal cationic species is an oxygen-containing inorganic compound of any of various metals selected from the group consisting of lithium, sodium, potassium, zinc, calcium, magnesium, nickel, manganese, copper, titanium, aluminum, and combinations thereof.

The mixing time between the phenolic resin used to prepare the ionomer composition and the ionomer material is typically from about 10 seconds to about 10 minutes, preferably from about 20 seconds to about 7 minutes, and more preferably from about 30 seconds to about 5 minutes.

The ionomer composition of the present invention which is employed as a golf ball material may be used as a cover material or an intermediate layer material in a two-piece solid golf ball composed of a core and a cover encasing the core, or in a multi-piece solid golf ball composed of a core of at least one layer, one or more intermediate layer which encases the core, and a cover of at least one layer which encases the intermediate layer. Methods that may be used to manufacture golf balls using the above golf ball material include injection-molding methods already known to the art.

Golf balls in which the ionomer composition of the invention is used have a weight in a range of preferably from about 44.80 to about 45.70 g.

Golf balls in which the ionomer composition of the invention is used have a diameter in a range of preferably from about 42.65 to about 42.80 mm.

As explained above, the golf ball material of the present invention, by including a phenolic resin in an ionomer composition in which the base component is an ionomer, has an increased hardness and thus improved properties such as rebound resilience and durability. By using this golf ball material as an essential part of a golf ball, the properties of the golf ball can be improved.

EXAMPLES

The following experiments and controls are provided by way of illustration and not by way of limitation.

Experiment 1

A combined amount of about 80 g of a zinc-neutralized ionomer and "Resol-1" (softening point, approx. 88° C.) was melt-mixed in the proportions shown in Table 1 for a mixing time of 5 minutes (consisting of an ionomer melting time of 2.5 minutes and a resol blending and mixing time of 2.5 minutes) using a Labo Plastomill (R-100, manufactured by Toyo Seiki Seisaku-Sho, Ltd.) set to a temperature of 180° C. and a rotor speed of 60 rpm, and the change in torque was observed. The change in torque is defined as the difference $T_1-T_0$ between the torque when melting the zinc-neutralized ionomer alone ($T_0$) and the torque when melting the composition after resol addition ($T_1$). For the sake of reference, the temperature change at this time ($t_0 \to t_1$) is also indicated.

In Experiment 1, a large change in torque was observed relative to the ionomer base resin which did not contain metal cations in Control 1, confirming that the zinc cations in the ionomer interacted with the resol. The temperature changes also differed considerably.

Experiments 2 and 3

Aside from employing a sodium-neutralized ionomer in Experiment 2 and a magnesium-neutralized ionomer in Experiment 3 instead of the zinc-neutralized ionomer used in Experiment 1, the same procedure was repeated as in Experiment 1 using the proportions shown in Table 1. As in Experiment 1, both Experiments 2 and 3 showed large changes in torque relative to Control 1, thereby confirming that interactions occurred between the metal cations and the resol. Temperature changes were also confirmed.

From the standpoint of the change in torque, the cationic species having large interactions with the resol were, in the order of the magnitude of the interactions, $Zn^{2+}>Mg^{2+}>Na^+$. From this, it was apparent that those metal cationic species which exhibit transition metal properties tend to have larger interactions with the resol.

Experiment 4

The same procedure as in Experiment 1 with the Labo Plastomill was repeated using, in the blending proportions shown in Table 2, the zinc-neutralized ionomer (used in Experiment 1) which, based on the results obtained in Experiments 1 to 3, interacts strongly with resol and using "Resol-2" having a high softening point of 123° C., thereby obtaining a zinc-neutralized ionomer containing "Resol-2." In addition, this material was formed into a sheet using a hot press, and the sheet properties were evaluated one week layer. Those results are shown in Table 2.

In Experiment 4, including a small amount of the high-softening point "Resol-2" resulted in an increase in hardness relative to the zinc-neutralized ionomer prior to "Resol-2" addition (Control 2). Moreover, the strength at break increased and both the elongation at break and the MFR decreased, demonstrating the effects of interactions with "Resol-2."

Experiment 5

Using the same zinc-neutralized ionomer and "Resol-2" as in Experiment 4 and, taking into account commercial production conditions, a "Resol-2"-containing zinc-neutralized ionomer was prepared with a twin-screw extruder (screw diameter, 32 mm; overall L/D ratio, 41; kneading disc zone L/D ratio which is 40% of overall L/D ratio; with vacuum vent port; temperature setting, 230° C.; screw speed, 100 rpm; extrusion rate, 4.8 kg/hr). Unlike mixture with the Labo Plastomill carried out in above Experiments 1 to 4, due to motor overload, the amount of "Resol-2" addition had to be reduced. The sheet properties of the resulting material were evaluated two weeks later. Also, using the resulting composition as the cover material for two-piece golf balls and using crosslinked butadiene rubber cores (diameter, 39.3 mm; weight, 36.9 g; deflection, 3.25 mm), two-piece golf balls were manufactured by injection molding with an injection molding machine. Evaluations of these golf balls were carried out, the results from which are presented in Table 3. Among the sheet properties, the hardness increased relative to Control 3. Also, on shots with a driver, the resulting golf ball showed the desirable tendencies of a lower spin rate and an increased distance. In addition, the ball also had a good abrasion resistance, scuff resistance and ball durability.

Control 1

As a control for Experiments 1, 2 and 3, aside from employing an ionomer base resin containing no metal cations instead of an ionomer, the same procedure as in Experiment 1 was repeated using the blending proportions shown in Table 1. In Control 1, there was substantially no change in torque, confirming the absence of interactions between the ionomer base resin containing no metal cations and "Resol-1."

Control 2

As a control for Experiment 4, the sheet properties of the zinc-neutralized ionomer containing no "Resol-2" were evaluated after one week. The zinc-neutralized ionomer containing no "Resol-2" tended to have a low hardness and a low strength at break relative to Experiment 4.

Control 3

As a control for Experiment 5, aside from using a zinc-neutralized ionomer containing no "Resol-2" instead of the "Resol-2" containing zinc-neutralized ionomer of Experiment 5, two-piece golf balls were produced in the same way as in Experiment 5. Of the sheet properties, the hardness and strength at break both tended to be low relative to Experiment 5. In addition, the spin rate on shots with a driver was high, resulting in a poor distance.

TABLE 1

| Items | Experiment 1 | Experiment 2 | Experiment 3 | Control 1 |
|---|---|---|---|---|
| e. Resol-1 | 1.5 | 1.5 | 1.5 | 1.5 |
| d. Base resin | — | — | — | 98.5 |
| c. Mg-Ionomer | — | — | 98.5 | — |
| b. Na-Ionomer | — | 98.5 | — | — |
| a. Zn-Ionomer | 98.5 | — | — | — |
| Difference in Torque (kg · m) | 4.21 | 1.67 | 1.86 | 0.01 |
| Changed Torque (kg · m) ($T_0 \to T_1$) | 1.25→5.46 | 1.38→3.05 | 3.97→5.83 | 0.01→0.02 |
| Difference in Temperature (° C.) | 11 | 5 | 6 | 0 |
| Changed Temperature (° C.) ($t_0 \to t_1$) | 185→196 | 185→190 | 197→203 | 180→180 |

TABLE 2

| Items | Experiment 4 | Control 2 |
|---|---|---|
| f. Resol-2 | 1.4 | — |
| a. Zn-Ionomer | 99.6 | 100 |
| Difference in Torque (kg · m) | 4.48 | — |
| Changed Torque (kg · m) ($T_0 \to T_1$) | 0.95 → 5.43 | — |
| Difference in Temperature (° C.) | 9 | — |
| Changed Temperature (° C.) ($t_0 \to t_1$) | 183 → 192 | — |

TABLE 2-continued

| Items | Experiment 4 | Control 2 |
|---|---|---|
| Specific gravity | 0.967 | 0.970 |
| MFR (g/10 min, 190° C.) | 0.7 | 5.4 |
| Hardness (Shore D) | 61 | 59 |
| UTS (Mpa) | 32.5 | 27.9 |
| UTE (%) | 339 | 351 |

TABLE 3

| Items | | Experiment 5 | Control 3 |
|---|---|---|---|
| a. Resol-2 (Tamanol 526) | | 0.3 | — |
| b. S9945 | | 99.7 | 100 |
| Specific Gravity | | 0.966 | 0.970 |
| MFR (g/10 min. 190° C.) | | 1.9 | 5.5 |
| Hardness (Shore D) | | 61 | 60 |
| UTS (Ultimate Tensile Strength) (MPa) | | 27.6 | 26.9 |
| UTE (Ultimate Tensile Elongation) (%) | | 346 | 357 |
| GB Diameter (mm) | | 42.75 | 42.78 |
| GB Weight (g) | | 45.57 | 45.66 |
| Deflection (mm) 23° C. | | 2.77 | 2.76 |
| Initial Velocity (m/sec) 23° C. USGA | | 76.04 | 75.94 |
| Av. C.O.R | | 0.759 | 0.760 |
| Shot Number (Durability) | | 107 | 96 |
| Initial Velocity (m/sec) | Elevation | 57.4 | 57.4 |
| Back Spin (rpm) | Angle | 2712 | 2734 |
| Carry (m) | 12.9° | 183 | 182 |
| Total Distance (m) | (HS 41 m/s) | 200 | 196 |
| Scuff Resistance Average | | 2.5 | 3.0 |
| Abrasion Resistance (Sand) | | Better | Good |
| GB surface after trimming with #1000 & 3.5 sec | | Smooth | Smooth |

The materials and measurement methods in above Tables 1, 2 and 3 are described below. The crosslinked butadiene rubber core mentioned above was prepared in the following formulation.

| | |
|---|---|
| cis-1,4-Polybutadiene rubber (BR01; produced by JSR Corporation) | 100 parts by weight |
| Zinc diacrylates (Nippon Shokubai Co., Ltd.) | 21 parts by weight |
| Zinc oxide (Sakai Chemical Industry Co., Ltd.) | 5 parts by weight |
| Barium sulfate (Sakai Chemical Industry Co., Ltd.) | 26 parts by weight |
| Dicumyl peroxide (NOF Corporation) | 0.8 part by weight | a) Zn-Ionomer
  S9945; high-flow type; MFR, 5.4 g/10 min (DuPont)
b) Na-Ionomer
  S8945; high-flow type; MFR, 4.0 g/10 min (DuPont)
c) Mg-Ionomer
  AM7311; MFR, 0.7 g/10 min (DuPont)
d) Base Resin
  Nucrel 960; ethylene-methacrylic aid copolymer (DuPont)
e) Resol-1
  SP-1045; softening point, approx. 88° C. (Schenectady International)
f) Resol-2
  Tamanol 526; softening point, approx. 123° C. (Arakawa Chemical Industries)
MFR (g/10 min)
  The value measured in general accordance with JIS-K7210 at a test temperature of 190° C. and a test load of 21.18 N (2.16 kgf).

Shore D Hardness
  The Shore D hardness measured according to ASTM D-2240.
Elongation at Break (%), Tensile Strength (MPa)
  Measured according to JIS-K7161.
Deflection
  The golf ball was placed on a steel plate, and the deflection (mm) by the ball when compressed under a final load of 1,275 N (130 kgf) from an initial load of 98 N (10 kgf) was measured. This test was carried out at 23±1° C.
Initial Velocity (m/sec)
  The initial velocity of the ball was measured using an initial velocity measuring apparatus of the same type as the USGA drum rotation-type initial velocity instrument approved by the R&A. The ball was held isothermally at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.
Coefficient of Restitution (COR)
  The ball was fired from an air cannon against a steel plate at a velocity of 43 m/s, and the rebound velocity was measured. The coefficient of restitution (COR) is the ratio of the rebound velocity to the initial velocity of the ball. Each of the values shown is the average of ten measurements.
Shot Number (Durability)
  The durability of the golf ball was evaluated using an ADC Ball COR Durability Tester produced by Automated Design Corporation (U.S.). A ball was fired using air pressure and made to repeatedly strike two metal plates arranged in parallel. The average number of shots required for the ball to crack was treated as its durability. Average values were obtained by furnishing four balls of the same type for testing, repeatedly firing each ball until it cracked, and averaging the number of shots required for the respective balls to crack. The type of tester used was a horizontal COR durability tester, and the incident velocity of the balls on the metal plates was 43 m/s.
Back Spin, Carry and Total Distance
  Using a swing tester, a golf ball was hit at a head speed of 41 m/sec with a number one wood, and the initial velocity, carry, total distance and back spin at that time were measured.
Scuff Resistance
  The golf balls were held at a temperature of 23±1° C. then hit at a head speed of 33 m/s using a pitching wedge mounted on a swing robot machine, after which damage from the impact was visually rated according to the following scale.

| | |
|---|---|
| Best: | 1 point |
| Better: | 2 points |
| Good (ordinary): | 3 points |
| Poor: | 4 points |
| Poorer: | 5 points |
| Poorest: | 6 points |

Abrasion Resistance
  A tubular container having a five-liter capacity was filled with 15 golf balls and 1.7 liters of sand, after which the contents were mixed at 50 rpm for 2 hours. The balls were then removed and, based on a visual determination of the extent of surface marring and decreased gloss due to abrasion, the abrasion resistance was rated as follows.

Best
Better
Good (ordinary)
Poor
Poorer
Poorest

Ball Appearance after Surface Abrasion

The injection-molded golf ball was surface abraded (trimmed) with a #1000 grinding wheel for 4.5 seconds, following which the surface appearance of the ball was rated as follows.

Smooth
Less rough
Rough

The invention claimed is:

1. A golf ball comprising a core and a cover layer, or a core, a cover layer and at least one intermediate layer therebetween, wherein at least one layer of the core, the intermediate layer and the cover comprises an ionomer composition which includes a resol-type phenolic resin having a chemical structure of the following formula

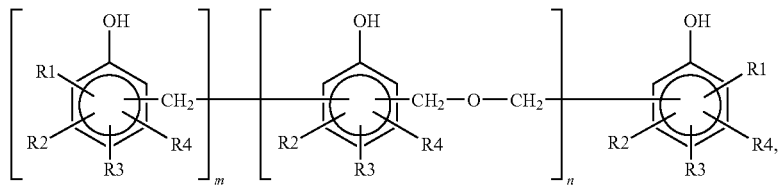

wherein $R_1$ is hydrogen or methylol; $R_2$, $R_3$ and $R_4$ are each independently hydrogen, an alkyl group, a cyclic alkyl group, an aralkyl group, an alkoxy group, an aryl or alkenyl group of from 1 to 20 carbons, hydroxyl or a halogen atom; and the letters m and n are each a number from 1 to about 50, and wherein the resol-type phenolic resin in the ionomer composition is included in a proportion, based on the total weight of the ionomer composition, of from about 0.01 to about 5.00 wt %.

2. The golf ball of claim 1, wherein the form of the resol-type phenolic resin is selected from the group consisting of bulk, powders and flakes.

3. The golf ball of claim 1, wherein the resol-type phenolic resin has a softening point (ring and ball method) in a range of from about 40° C. to about 180° C.

4. The golf ball of claim 1, wherein the melt flow rate (MFR) of the ionomer composition is from 0.3 to 15.

5. The golf ball of claim 1, wherein the resol-type phenolic resin has a softening point (ring and ball method) in a range of from about 30° C. to about 200° C.

6. The golf ball of claim 1, wherein adding the resol-type phenolic resin increases the Shore D hardness of the ionomer composition by from about 0.1 point to about 10 points.

7. The golf ball of claim 1, wherein the ionomer composition includes an ionomer component which is at least one type of copolymer of the formula E/X and/or terpolymer of the formula E/X/Y, E being an α-olefin, X being a $C_3$ to $C_8$ unsaturated carboxylic acid or unsaturated dicarboxylic acid (including acid anhydrides thereof) and Y being an unsaturated carboxylic acid alkyl ester or unsaturated dicarboxylic acid alkyl ester in which the alkyl has from 1 to 8 carbons, where X is present in an amount of from about 1 to about 30 wt % based on total weight of the E/X copolymer or the E/X/Y terpolymer and Y is present in an amount of from about 2 to about 30 wt % based on total weight of E/X/Y terpolymer, and which is neutralized by metal cations.

8. The golf ball of claim 7, wherein the metal cations in the ionomer component include lithium, sodium, potassium, zinc, calcium, magnesium, nickel, manganese, copper, titanium, aluminum, or a combination thereof.

9. The golf ball of claim 8, wherein the metal cations originate from a metal cation source which is an oxygen-containing inorganic compound.

10. The golf ball of claim 7, wherein the olefin being E is selected from the group consisting of ethylene, propylene, butene, heptene, hexene, heptene and octene.

11. The golf ball of claim 7, wherein the unsaturated carboxylic acid being X is selected from the group consisting of acrylic acid, methacrylic acid, (anhydrous) maleic acid and fumaric acid.

12. The golf ball of claim 7, wherein the unsaturated carboxylic acid ester being Y is selected from the group consisting of methyl methacrylate, ethyl methacrylate, propyl methacrylate, butyl methacrylate, methyl acrylate, ethyl acrylate, propyl acrylate and butyl acrylate.

13. A method for preparing a golf ball comprising a core and a cover layer, or a core, a cover layer and at least one intermediate layer therebetween, wherein at least one layer of the core, the intermediate layer and the cover comprises an ionomer composition, which method obtains the ionomer composition by using method (i) or (ii) below and further mold a golf material comprising the ionomer composition into a golf ball:

(i) melt blending an ionomer and a phenolic resin;
(ii) melt blending an ionomer base resin, a metal cation source and a phenolic resin, wherein the phenolic resin is a resol-type phenolic resin having a chemical structure of the following formula

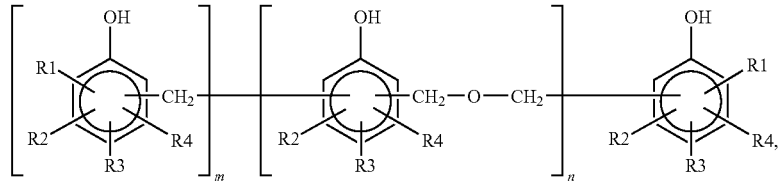

wherein $R_1$ is hydrogen or methylol; $R_2$, $R_3$ and $R_4$ are each independently hydrogen, an alkyl group, a cyclic alkyl group, an aralkyl group, an alkoxy group, an aryl or alkenyl group of from 1 to 20 carbons, hydroxyl or a halogen atom; and the letters m and n are each a number from 1 to about 50, and wherein the resol-type phenolic resin in the ionomer composition is included in a proportion, based on the total weight of the ionomer composition, of from about 0.01 to about 5.00 wt %.

14. The golf ball preparing method of claim 13 wherein, in method (ii), the ionomer composition is prepared by first uniformly mixing the ionomer base resin and the phenolic resin, then adding the metal cation source and melt blending while carrying out a neutralization reaction.

15. The method of claim 13, wherein the temperature at which the resol-type phenolic resin and the ionomer are mixed is from about 100 to about 250° C.

16. The method of claim 13, wherein the mixing time between the resol-type phenolic resin and the ionomer is from about 10 seconds to about 10 minutes.

* * * * *